UNITED STATES PATENT OFFICE 2,519,576

PRODUCTION OF ARYLINDANS

Vladimir N. Ipatieff and Herman Pines, Chicago, Ill., assignors to Universal Oil Products Company, Chicago, Ill., a corporation of Delaware No Drawing. Application June 30, 1948, Serial No. 36,273

18 Claims. (Cl. 260—668)

This invention relates to a process for producing aryl indan hydrocarbons and particularly for producing phenyl indan hydrocarbons and alkylated or cycloalkylated phenyl indan hydrocarbons.

An object of this invention is the production of an aryl indan hydrocarbon.

Another object of this invention is the production of an alkylated aryl indan hydrocarbon.

A further object of this invention is the production of an alkylatable phenyl indan.

One specific embodiment of this invention relates to a process for producing an indan hydrocarbon which comprises reacting at hydrogen transfer conditions in the presence of an acid-acting catalyst, a tertiary phenol and a para-dialkylated aromatic hydrocarbon having as one substituent a hydrocarbon group containing only one hydrogen atom joined to the carbon atom combined with the aromatic ring.

Another embodiment of this invention relates to a process for producing an indan hydrocarbon which comprises reacting at hydrogen transfer conditions in the presence of an acid-acting catalyst a tertiary alkyl phenol and a para-dialkylated benzene hydrocarbon, having as one substituent a hydrocarbon group containing only one hydrogen atom joined to the carbon atom combined with the benzene ring.

An additional embodiment of this invention relates to a process for producing an aryl indan hydrocarbon which comprises reacting at hydrogen transfer conditions in the presence of an acid-acting catalyst a tertiary alkyl phenol and a benzene hydrocarbon of the formula

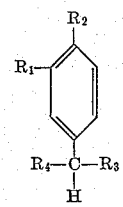

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, and a cycloalkyl radical.

A further embodiment of this invention relates to a process for producing aryl indan hydrocarbons which comprises reacting at hydrogen transfer conditions in the presence of a hydrogen fluoride catalyst, tertiary butyl phenol and a benzene hydrocarbon of the formula:

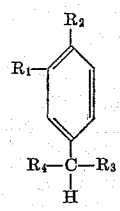

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, and a cycloalkyl radical.

A still further embodiment of this invention relates to a process for producing aryl indan hydrocarbons which comprises reacting at hydrogen transfer conditions in the presence of a hydrogen fluoride catalyst, tertiary amyl phenol and a benzene hydrocarbon of the formula:

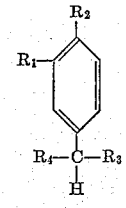

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, and a cycloalkyl radical.

We have developed a method for producing indan hydrocarbons by effecting a hydrogen transfer reaction between a tertiary alkyl phenol and an aromatic hydrocarbon containing at least two and not more than five hydrocarbon substituents with two alkyl substituents in para positions to one another. One of said para substituents contains at least three carbon atoms and also has a hydrogen atom combined with the carbon atom that is joined to the aromatic ring. The reaction is illustrated by the following equation wherein a tertiary alkyl phenol is reacted with para-cymene in the presence of an acid-acting catalyst to give a substantial yield of 1,3,3,6- tetramethyl-1-p-tolylindan and also to form phenol and a paraffinic hydrocarbon, RH.

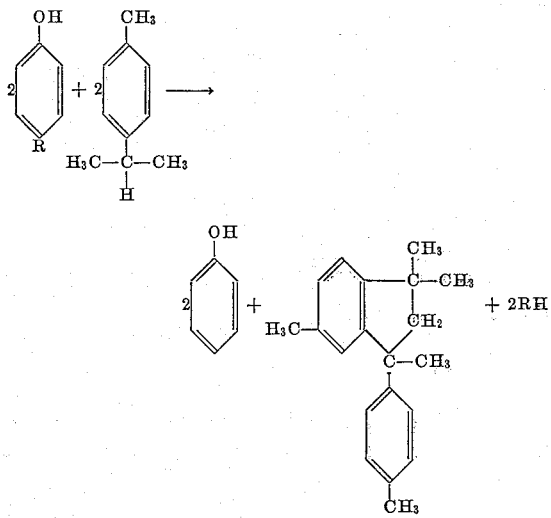

R = a tertiary alkyl or a tertiary cycloalkyl group

The aromatic compound used in this synthesis of an indan contains at least one para-arrangement of hydrocarbon group substituents in order to take part in this hydrogen transfer reaction. Also one of the substituents in the para-arrangement must have only one hydrogen atom combined with the carbon atom attached to the benzene ring. Accordingly, this hydrocarbon substituent which contains the tertiary hydrogen atom also contains at least three carbon atoms. Such aromatic hydrocarbons which are useful as starting materials for the process have the structures represented by the formula:

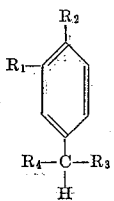

wherein $R_1$ represents a member selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, a cycloalkyl radical, and a bicycloalkyl radical. The combination of the different groups should be balanced so as to avoid steric hindrance. Also aromatic hydrocarbons and particularly benzene hydrocarbons containing more than three hydrocarbon substituent groups may also be present in a starting material provided that such a hydrocarbon has a replaceable hydrogen atom combined with a nuclear carbon atom adjacent to the carbon atom which is combined with the group:

Such aromatic starting materials include p-cymene, 1,2-dimethyl-4-isopropylbenzene, 2,4-diisopropyltoluene, 4 - isopropyl - 2 - cyclohexyltoluene, etc.

The tertiary alkylated phenols used as starting materials in this process comprise tertiary alkyl and tertiary cycloalkyl phenols including tertiary butyl phenol, tertiary amyl phenol, and other tertiary alkyl phenols in which the substituent group contains more than five carbon atoms, tertiary methylcyclohexyl phenol, and the like. These tertiary alkylated phenols may be formed by alkylating phenol with a tertiary olefin in the presence of an acid-acting catalyst. Thus the interaction of phenol with isobutylene in the presence of phosphoric acid catalyst produces tertiary butyl phenol while similar interaction of a branched chain pentene with phenol yields a tertiary amyl phenol.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acids, fluorophosphoric acids; and Friedel-Crafts halide catalysts, particularly aluminum chloride, aluminum bromide, ferric chloride, zirconium chloride, boron fluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc., for this reaction.

The operating conditions used in the process are dependent upon the nature of the hydrocarbon and branched chain alcohols being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about −30° to about 100° C., and at a pressure up to about 100 atmospheres. However, in the presence of hydrogen fluoride, sulfuric acid, and aluminum chloride catalysts the preferred operating temperature is generally from about 0° to about 50° C., while in contact with ferric chloride catalyst the preferred operating temperature is from about 50° to about 100° C.

Our process is carried out in either batch or continuous type of operation. In batch type operation, the usual procedure consists in placing a mineral acid or Friedel-Crafts catalyst and a portion, generally about 50% of the aromatic hydrocarbon in a reactor provided with a mechanically driven stirrer, cooling these materials to a temperature of from about 0° to about 10° C., and adding therewith with stirring a solution of a tertiary alkylated phenol in the remainder of the aromatic hydrocarbon. The reaction mixture is then separated and the product is washed, dried, and distilled to separate therefrom the indan hydrocarbons. Unconverted aromatic hydrocarbons recovered in this distillation are utilizable in the further operation of the process.

The process is also carried out in a continuous manner by passing the aromatic hydrocarbon and tertiary alkylated phenol through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as a supported Friedel-Crafts type catalyst is used as a fixed bed in the reactor and the aromatic and cycloolefinic hydrocarbons are passed therethrough, the resultant hydrocarbon product usually requires no washing and drying treatment and the desired indan hydrocarbons are separated therefrom by suitable means such as by fractional distillation.

In order to obtain relatively high yields of indan hydrocarbons by our process, it is necessary to use rather carefully selected hydrocarbon fractions as charging stocks. As already indicated herein, only certain types of aromatic hydrocarbons, namely those containing particular substituents are utilizable as starting materials to produce indan-type hydrocarbons. Thus isopropyltoluene, s-butyltoluene, paradiisopropylbenzene and others react readily with a tertiary alkyl phenol or a tertiary cycloalkyl phenol to form an indan hydrocarbon and a saturated hydrocarbon, the latter having substantially the same carbon skeleton as that of the tertiary alkyl group of the phenol charged to the process. An aromatic hydrocarbon which does not contain the aforementioned disubstitution in para position does not react with a tertiary alkyl phenol to give the desired hydrogen transfer reaction. Also an alkyl phenol which does not have a tertiary alkyl or tertiary cycloalkyl group does not undergo hydrogen transfer with the aromatic hydrocarbon also charged to the process. Accordingly, in order to obtain the hydrogen transfer reaction, it is necessary to use a tertiary alkylated phenol together with a disubstituted benzene hydrocarbon in which the substituents are in para positions and one of said substituents comprises an isopropyl group or other hydrocarbon group in which only one hydrogen atom is combined with the carbon atom adjacent to the aromatic nucleus.

The indans formed in this process may be sulfonated and hydrolyzed to form phenols or they may be nitrated and reduced to the corresponding amines. The amines may then be diazotized and converted into phenols, which may be used as inhibitors to delay oxidation and deterioration of hydrocarbons, fats, etc. The sulfonation product of an indan containing a long alkyl, cycloalkalkyl or cycloalkyl group may also be converted into a detergent. Some of the indan hydrocarbons formed in the process are also useful as additives in lubricating oils.

The following example is given to illustrate the character of results obtained by the use of a specific embodiment of the present invention, although the data presented are not introduced with the intention of unduly restricting the generally broad scope of the invention.

One hundred grams (0.75 M) of p-cymene, 41 grams (0.25 M) of p-t-amylphenol and 55 grams of hydrogen fluoride were stirred for 2 hours at 0-3° C. The product was poured into ice, the organic material was separated from the acid and washed with water. The phenols were removed from the hydrocarbons by an alkali wash, the alkaline solution was then acidified with hydrochloric acid, the liberated phenols were washed, dried, and distilled.

The hydrocarbon layer on distillation yielded the following fractions:

| Cut | Vap. T, °C. | Pressure, mm. | Corrected Temp., °C. 760 mm. | Weight, grams | $n_D^{20}$ |
|---|---|---|---|---|---|
| V-1,2,3 | 54-55 | 9.5 | 175 | 65.3 | 1.4910 |
| V-4 | 55-103 | 9.0 | 175-238 | 2.7 | 1.5009 |
| V-5 | 103-107 | 9.0 | 238-243 | 2.8 | 1.5105 |
| V-6 | 107-167 | 8.0 | 243-325 | 2.8 | 1.5200 |
| V-7 | 167-169 | 7.5 | 325-330 | 12.0 | 1.5572 |
| V-8 | 169-175 | 7.5 | 330-336 | 2.1 | 1.5588 |
| Bottoms | | | | 3.9 | |

*Distillation of alkali soluble product* [1]

| Cut | Vap. T, °C. | Weight, grams |
|---|---|---|
| A-2,3 | 170-180 | [2] 10.0 |
| A-4 | 180-241 | 3.4 |
| A-5 | 241-243 | 1.4 |

[1] Part of the alkali soluble material was lost during washing.
[2] Crystals.

*Weight balance of products* p-Cymene reacted: 34 grams (0.254 M)

Amyl-p-cymene formed: 5.8 grams (0.028 M) or 11 mol per cent based on p-cymene reacted.

1,3,3,6-tetramethyl-1-p-tolylindan formed: 15 grams (0.06 M) or 46 mol per cent based on p-cymene reacted.

Phenol formed on loss free basis based on amylphenol charged: 77%.

We claim as our invention:

1. A process for producing an indan hydrocarbon which comprises reacting at a hydrogen transfer temperature of from about −30° to about 100° C. in the presence of an acid-acting catalyst, a tertiary alkylated phenol and an alkylated aromatic hydrocarbon having two hydrocarbon groups in para positions to each other and having as one substituent an alkyl group containing only one hydrogen atom joined to the carbon atom combined with the aromatic ring and having a hydrogen atom combined with a carbon atom of the ring which is adjacent to the carbon atom of the ring which is combined with said alkyl group.

2. A process for producing an indan hydrocarbon which comprises reacting at a hydrogen transfer temperature of from about −30° to about 100° C. in the presence of an acid-acting catalyst, a tertiary alkyl phenol and an alkylated benzene hydrocarbon having two hydrocarbon groups in para positions to each other and having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

3. A process for producing an indan hydrocarbon which comprises reacting at a hydrogen transfer temperature of from about −30° to about 100° C. in the presence of an acid-acting catalyst, a tertiary alkyl phenol and a para-dialkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

4. A process for producing an aryl indan hydrocarbon which comprises reacting at a hydrogen transfer temperature of from about −30° to about 100° C. in the presence of a mineral acid catalyst a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

5. A process for producing an aryl indan hydrocarbon which comprises reacting at a hydrogen transfer temperature of from about −30° to 100° C. in the presence of a hydrogen fluoride catalyst a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

6. A process for producing an aryl indan hydrocarbon which comprises reacting at a hydrogen transfer temperature of from −30° to about 100° C. in the presence of a hydrogen fluoride catalyst, tertiary butyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

7. A process for producing an aryl indan hydrocarbon which comprises reacting at a hydrogen transfer temperature of from about −30° to about 100° C. in the presence of a hydrogen fluoride catalyst, tertiary amyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

8. A process for producing an aryl indan hydrocarbon which comprises reacting at a temperature of from about −30° to about 100° C. in the presence of a mineral acid catalyst a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

9. A process for producing an aryl indan hydrocarbon which comprises reacting at a temperature of from about 0° to about 50° C. in the presence of a mineral acid catalyst a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

10. A process for producing an aryl indan hydrocarbon which comprises reacting at a temperature of from about 0° to about 50° C. in the presence of a sulfuric acid catalyst, a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

11. A process for producing an aryl indan hydrocarbon which comprises reacting at a temperature of from about 0° to about 50° C. in the presence of a hydrogen fluoride catalyst, a tertiary alkyl phenol and a para-di-alkylated benzene hydrocarbon having as one substituent an alkyl group containing only one hydrogen atom joined to the carbon atom combined with the benzene ring and having a hydrogen atom combined with a carbon atom of the ring which is adjacent to the carbon atom of the ring which is combined with said alkyl group.

12. A process for producing 1,3,3,6-tetramethyl-1-p-tolylindan which comprises reacting p-cymene and a tertiary alkyl phenol at a temperature of from about −30° to about 100° C. in the presence of an acid-acting catalyst at hydrogen transfer conditions.

13. A process for producing 1,3,3,6-tetramethyl-1-p-tolylindan which comprises reacting p-cymene and a tertiary alkyl phenol in the presence of a mineral acid catalyst at a temperature of from about −30° to about 100° C.

14. A process for producing 1,3,3,6-tetramethyl-1-p-tolylindan which comprises reacting p-cymene and a tertiary alkyl phenol in the presence of a mineral acid catalyst at a temperature of from about 0° to about 50° C.

15. A process for producing 1,3,3,6-tetramethyl-1-p-tolylindan which comprises reacting p-cymene and a tertiary alkyl phenol in the presence of a sulfuric acid catalyst at a temperature of from about 0° to about 50° C.

16. A process for producing 1,3,3,6-tetramethyl-1-p-tolylindan which comprises reacting p-cymene and a tertiary alkyl phenol in the presence of a hydrogen fluoride catalyst at a temperature of from about 0° to about 50° C.

17. A process for producing 1,3,3,6-tetramethyl-1-p-tolylindan which comprises reacting p-cymene and tertiary butyl phenol in the presence of a hydrogen fluoride catalyst at a temperature of from about 0° to about 50° C.

18. A process for producing 1,3,3,6-tetramethyl-1-p-tolylindan which comprises reacting p-cymene and tertiary amyl phenol in the presence of a hydrogen fluoride catalyst at a temperature of from about 0° to about 50° C.

VLADIMIR N. IPATIEFF.
HERMAN PINES.

REFERENCES CITED

The following references are of record in the file of this patent:

UNITED STATES PATENTS

| Number | Name | Date |
|---|---|---|
| 1,951,123 | Barbier | Mar. 13, 1934 |
| 2,429,691 | Johnson et al. | Oct. 28, 1947 |

OTHER REFERENCES

Puranen: Chem. Abs., vol. 27, 5062–3 (1933).